United States Patent
Hayashi et al.

(10) Patent No.: US 12,273,612 B1
(45) Date of Patent: Apr. 8, 2025

(54) TEST SYSTEM

(71) Applicant: Leimac Ltd., Moriyama (JP)

(72) Inventors: Yuhei Hayashi, Moriyama (JP); Jun Mitsudo, Moriyama (JP)

(73) Assignee: Leimac Ltd., Moriyama (JP)

( * ) Notice: Subject to any disclaimer, the term of this patent is extended or adjusted under 35 U.S.C. 154(b) by 0 days.

(21) Appl. No.: 18/858,729

(22) PCT Filed: Nov. 18, 2022

(86) PCT No.: PCT/JP2022/042925
§ 371 (c)(1),
(2) Date: Oct. 21, 2024

(87) PCT Pub. No.: WO2023/238424
PCT Pub. Date: Dec. 14, 2023

(30) Foreign Application Priority Data

Jun. 8, 2022 (JP) .................................. 2022-093359

(51) Int. Cl.
H04N 23/56 (2023.01)
G01N 21/88 (2006.01)
H04N 23/95 (2023.01)

(52) U.S. Cl.
CPC ............. *H04N 23/56* (2023.01); *H04N 23/95* (2023.01); *G01N 2021/8838* (2013.01)

(58) Field of Classification Search
CPC . H04N 23/56; H04N 23/95; G01N 2021/8838
See application file for complete search history.

(56) References Cited

U.S. PATENT DOCUMENTS

| 5,519,533 A | * | 5/1996 | Nomura | ................. | G09G 3/003 348/E13.043 |
| 11,159,735 B2 | * | 10/2021 | Watson | ................. | H04N 23/74 |

(Continued)

FOREIGN PATENT DOCUMENTS

| JP | 199823310 | 1/1998 |
| JP | 2007003543 A | 1/2007 |

(Continued)

OTHER PUBLICATIONS

International Search Report from International Application PCT/JP2022/042925.

(Continued)

*Primary Examiner* — Chiawei Chen
(74) *Attorney, Agent, or Firm* — United IP Counselors, LLC (57) ABSTRACT

The disclosed test system includes: a lighting apparatus which emits light from multiple light-emitting elements to illuminate a product to be inspected; a lighting controller which divides the light-emitting elements into N number of areas, and sequentially supplies current to emit light in each lighting period; a camera which sequentially captures images of the product in an image-capturing period synchronizing with the lighting period; a test system control device; a first wiring cable which supplies DC power from the camera to the light controller; and a second wiring cable which supplies DC power from the test system control device to the camera. N number of images captured by the camera are reconstructed to one inspection image through inter-image calculation or inter-pixel calculation. The disclosed system simplifies wiring.

5 Claims, 12 Drawing Sheets

(56) References Cited

U.S. PATENT DOCUMENTS

| | | |
|---|---|---|
| 2011/0267451 A1 | 11/2011 | Drescher et al. |
| 2016/0088203 A1* | 3/2016 | Maeda ................... H04N 23/56 |
| | | 362/230 |
| 2016/0370299 A1* | 12/2016 | Kolb ...................... G01N 21/90 |
| 2024/0118218 A1* | 4/2024 | Hu ..................... G01N 21/8901 |

FOREIGN PATENT DOCUMENTS

| | | |
|---|---|---|
| JP | 2018017631 A | 2/2018 |
| JP | 2018181589 A | 11/2018 |

OTHER PUBLICATIONS

Written Opinion from International Application PCT/JP2022/042925.

* cited by examiner

TEST SYSTEM

TECHNICAL FIELD

The present invention relates to a test system that inspects a product by emitting light to the product and capturing an image of the product.

BACKGROUND ART

In a case of inspecting a product (goods), which is produced in a production line of a factory, on an inspection line, an image of the product has been captured by lighting the product with a lighting apparatus so that defects, foreign substance adhesion, and the like are not missed. The lighting apparatus receives current supplied from a lighting controller, thereby emitting light to light the product. An image capturing period of the camera is controlled by a test system control device that comprehensively controls the test system, and the captured image is sent to the test system control device. In order for a lighting period of the lighting apparatus to synchronize with the image capturing period, a lighting controller is controlled by the camera or by the test system control device.

The lighting controller here supplies a large current, required for lighting the product, to the lighting apparatus, hence required power is normally supplied from an AC outlet to the lighting controller through an AC power supply wiring cable, as indicated in Patent Document 1, for example.

PRIOR ART DOCUMENTS

Patent Document

[Patent Document 1] Japanese Patent Application Publication No. 2018-181589

SUMMARY OF INVENTION

Technical Problem

However if the AC power supply wiring cable is installed for the lighting controller in the test system, wiring becomes complicated due to the presence of other wiring cables (wiring cable between the test system control device and the camera and wiring cable between the camera (or the test system control device) and the lighting controller), therefore wiring errors and the like more easily occur.

With the foregoing in view, it is an object of the present invention to provide a test system of which wiring can be simplified.

Solution to Problem

To achieve the above object, a test system according to an embodiment of the present invention includes: a lighting apparatus which includes a plurality of light-emitting elements, and which emits light from the plurality of light-emitting elements so as to light a product to be inspected; a lighting controller, which divides the plurality of light-emitting elements into N number of areas (N is 2 or greater natural number), and sequentially supplies current to each of the N number of areas so as to emit light in each lighting period; a camera which sequentially captures images of the product in an image capturing period synchronizing with the lighting period; a test system control device; a first wiring cable which supplies DC power from the camera to the lighting controller, or from the lighting controller to the camera; and a second wiring cable which supplies DC power from the test system control device to the camera, or from the test system control device to the lighting controller. N number of images captured by the camera are reconstructed to one inspection image in the test system control device or in the camera, through inter-image calculation, or through inter-image calculation and inter-pixel calculation.

It is preferable that the inter-image calculation is calculation, for each pixel, of selecting a brightness value of one image out of the N number of images, or selecting and adding brightness values of a plurality of images out of the N number of images, or is calculation of selecting and averaging brightness values of a plurality of the images out of the N number of images.

It is preferable that the first wiring cable supplies the DC power from the camera to the lighting controller and transmits a signal to control the lighting period, and the second wiring cable supplies the DC power from the test system control device to the camera and transmits a signal to control the image capturing period.

It is also preferable that the first wiring cable supplies the DC power from the lighting controller to the camera and transmits a signal to control the image capturing period, and the second wiring cable supplies the DC power from the test system control device to the lighting controller and transmits a signal to control the lighting period.

The lighting apparatus can include red, green and blue light-emitting elements for each of the N number of areas, and the lighting controller sequentially supplies current to the light-emitting elements having a first color out of the red, green and blue in each of the N number of areas to emit the light in the lighting period, then sequentially supplies current to the light-emitting elements having a second color, other than the first color, in each of the N number of areas to emit the light in the lighting period, and then sequentially supplies current to the light-emitting elements having a third color, other than the first color and the second color, in each of the N number of areas to emit the light in the lighting period.

Effect of Invention

According to the test system of the present invention, wiring can be simplified.

Description of Embodiments

Figure 1:
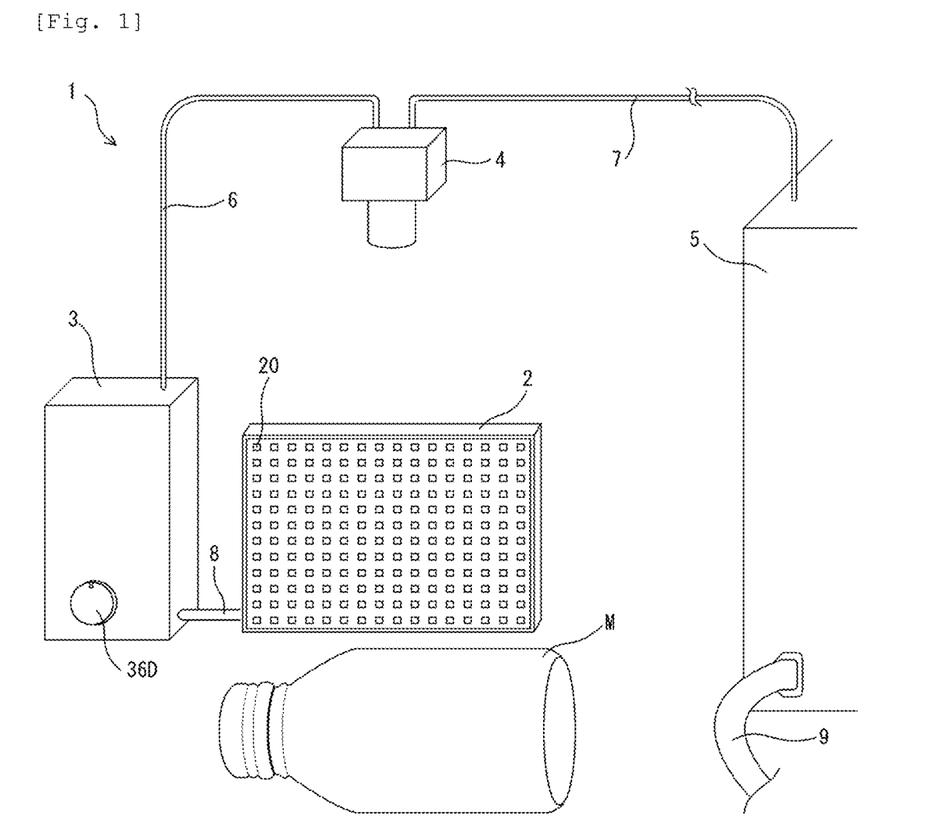
FIG. 1 is a schematic external view depicting a test system according to an embodiment of the present invention.

Embodiments of the present invention will now be described. As illustrated in FIG. 1, a test system 1 according to an embodiment of the present invention includes a lighting apparatus 2, a lighting controller 3, a camera 4, a test system control device 5, a first wiring cable 6, and a second wiring cable 7. In FIG. 1, the camera 4 is capturing images in a state where a product M is being lighted by the lighting apparatus 2. FIG. 1 illustrates a coffee bottle as an example of the product M, the lighting apparatus 2 is disposed behind the product M, and a surface (front face) that emits light of the lighting apparatus 2 is inclined forward. The camera 4 is disposed above the product M. The test system control device 5 is normally located at a relatively distant place.

The lighting apparatus 2 includes a plurality of light-emitting elements (e.g. LED) 20. The lighting apparatus 2 emits light from the plurality of light-emitting elements 20, and lights the product M to be inspected. The lighting apparatus 2 may be, for example, a surface lighting apparatus, where a plurality of light-emitting elements 20 are disposed on the surface (vertically and horizontally), a linear lighting apparatus where the light-emitting elements 20 are disposed linearly, or a ring type lighting apparatus where the light-emitting elements 20 are disposed in a ring shape. The lighting apparatus 2 illustrated in FIG. 1 and in the later mentioned FIG. 2 is a surface lighting apparatus, and a total of 192 (12 vertically×16 horizontally) light-emitting elements 20 are disposed on the surface.

Figure 2:
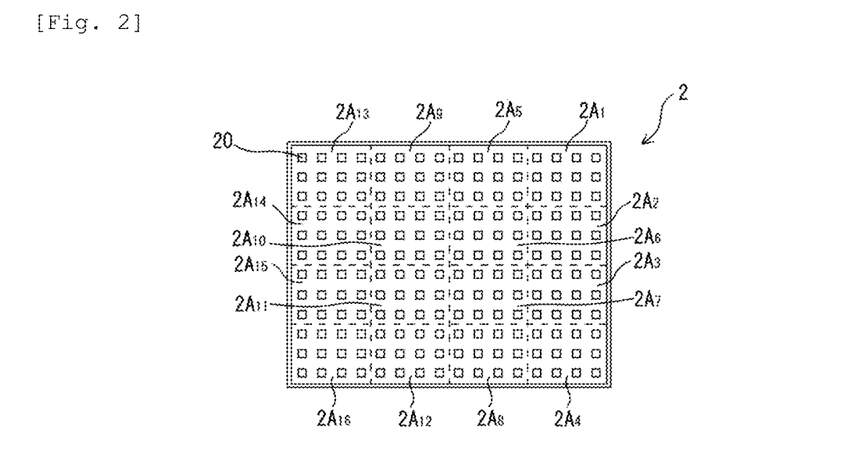
FIG. 2 is a front view depicting an example of a lighting apparatus of the test system.

In the lighting apparatus 2, the plurality of light-emitting elements 20 are divided into N number of areas, $2A_1$ to $2A_N$, as illustrated in FIG. 2, and electric current is supplied to each of the areas $2A_1$ to $2A_N$ (i.e., each area $2A_J$ (J is a natural number in the 1 to N range)) so as to implement light emission by each area $2A_J$ respectively. In FIG. 2, the broken line indicates the dividing line of each area $2A_J$, and N is 16 and a number of light-emitting elements 20 in each area $2A_J$ is 12 (3 vertically×4 horizontally).

Figure 3:
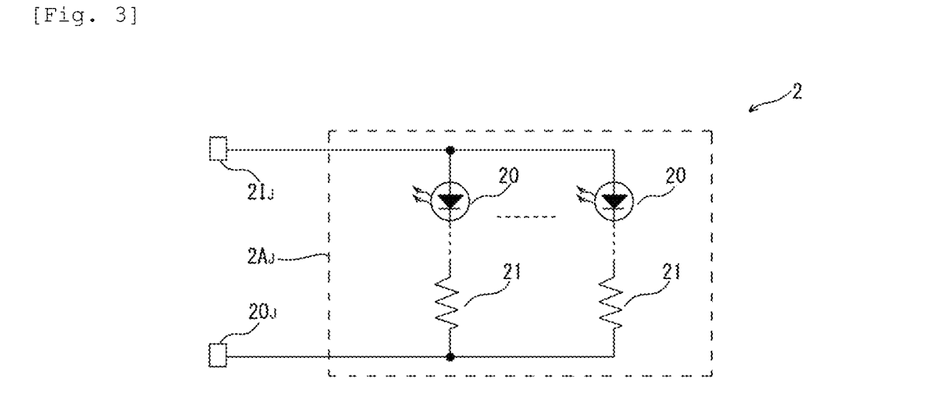
FIG. 3 is a circuit diagram depicting an example of a lighting apparatus of the test system.

In the lighting apparatus 2, a plurality of light-emitting elements 20 are connected in parallel and/or in serial. As indicated in FIG. 3, in the lighting apparatus 2 a current inflow terminal $21I_J$ and a current outflow terminal 20J can be disposed for each area $2A_J$. In FIG. 3, the reference sign 21 indicates a resistor for controlling the current. Either one of the current inflow terminal $21I_J$ and the current outflow terminal $20O_J$ may be common to the areas $2A_1$ to $2A_N$.

The lighting controller 3 divides the plurality of light-emitting elements 20 into N number of areas, $2A_1$ to $2A_N$, and sequentially supplies the current $I_J$ to each area $2A_J$ to emit light in a lighting period Ta.

The lighting controller 3 operates when the DC (direct current) power is supplied through the first wiring cable 6. In the lighting controller 3, the supplied DC power is directly used, or is stepped up or down and then used.

Figure 4:
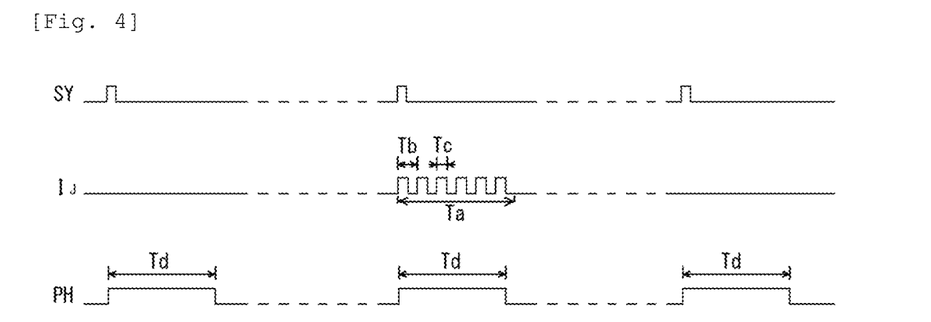
FIG. 4 is a simplified waveform diagram depicting timings of lighting and image capturing of the test system.

The lighting period Ta synchronizes with a later mentioned image capturing period Td, and the lighting period Ta is controlled by a signal to control the lighting period Ta (including a synchronizing signal SY to synchronize the image capturing period Td and the lighting period Ta), transmitted through the first wiring cable 6 (see FIG. 4). The lighting period Ta is set in advance, and can be 5 milliseconds to 20 milliseconds, for example. To supply the current, the pulse current of a PWM can be used. A cycle Tb of the PWM can be about 8 microseconds, for example. A pulse width Tc of the PWM is a duration in accordance with a predetermined gradation of light dimmed. In FIG. 4, the cycle Tb and the pulse width Tc are enlarged for easier understanding.

Figure 5:
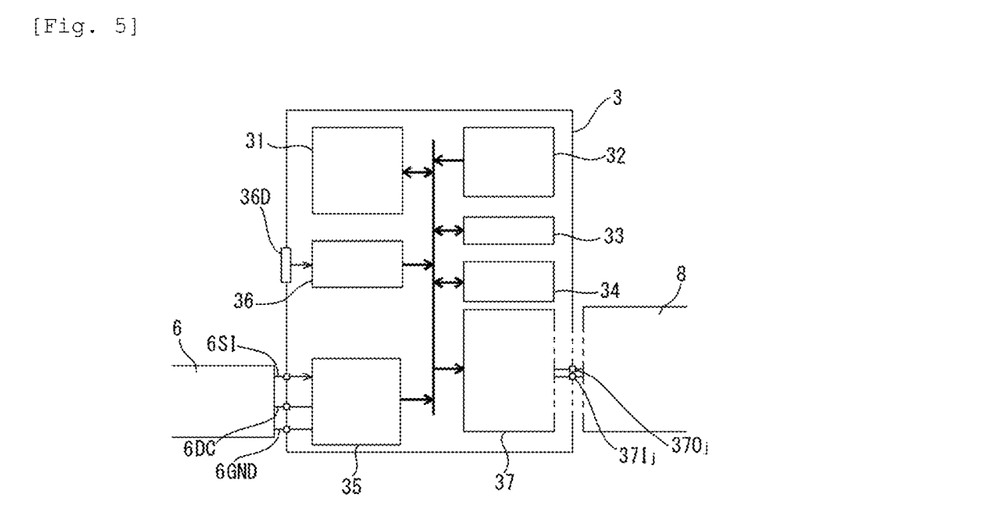
FIG. 5 is a block diagram depicting an example of a lighting controller of the test system.

The detailed configuration of the lighting controller 3 is not especially limited, but may include a CPU 31, a program unit 32, a set value storing unit 33, a work memory unit 34, an interface unit 35, a setting unit 36, and a lighting apparatus current supply unit 37, for example, as illustrated in FIG. 5. In the lighting controller 3, each unit is controlled by the CPU 31 using the work memory unit 34 in accordance with programs stored in the program unit 32.

The interface unit 35 is a portion to which the first wiring cable 6 is connected. The first wiring cable 6 may include a power line 6DC to supply DC power, a signal line 6SI for a signal to control the lighting period Ta, a ground line 6GND, and terminals to connect each of these lines may be disposed in the interface unit 35. The signal line 6SI may be one line or a plurality of lines.

The setting unit 36 can cause the set value storing unit 33 to store such values as the above mentioned lighting period Ta and the pulse width Tc which are set by a setting dial 36D or the like. For the set value storing unit 33, a non-volatile memory or the like may be used. In the lighting apparatus current supply unit 37, a lighting apparatus current outflow terminal 37$O_J$ and a lighting apparatus current inflow terminal 37$I_J$, which are connected to the current inflow terminal 2$I_J$ and the current outflow terminal 2$O_J$ of each area 2$A_J$ of the lighting apparatus 2 respectively, may be disposed.

The lighting controller 3 and the lighting apparatus 2 may be separated and connected using a connecting member 8 (e.g. wiring cable), or may be integrated.

The camera 4 will be described next.

The camera 4 supplies the DC power to the lighting controller 3 through the first wiring cable 6. The voltage of the DC power is 3.3 V or 5 V, for example.

The amount of power that the camera 4 can supply to the outside is small. The lighting controller 3, on the other hand, sequentially (not all at once) supplies the current $I_J$ to each area 2$A_J$ of the lighting apparatus 2, hence the lighting controller 3 does not require a large amount of power. Therefore it's possible for the camera 4 to supply the required power to the lighting controller 3.

Thus it is sufficient for the lighting controller 3 to connect only the first wiring cable 6 from the camera 4, without connecting an AC power supply wiring cable. Therefore wiring can be simplified.

The camera 4 also sends signals to control the lighting period Ta, including the synchronizing signal SY, to the lighting controller 3 through the first wiring cable 6.

Then the camera 4 sequentially captures images of the product M in the image capturing period Td, synchronizing with the lighting period Ta (see FIG. 4). In other words, light is emitted from the area 2$A_J$ of the lighting apparatus 2 in the lighting period Ta, synchronizing with the synchronizing signal SY transmitted from the camera 4, and the camera 4 captures an image in the image capturing period Td. In FIG. 4, the signal to start the image capturing is indicated by PH.

Figure 6A:
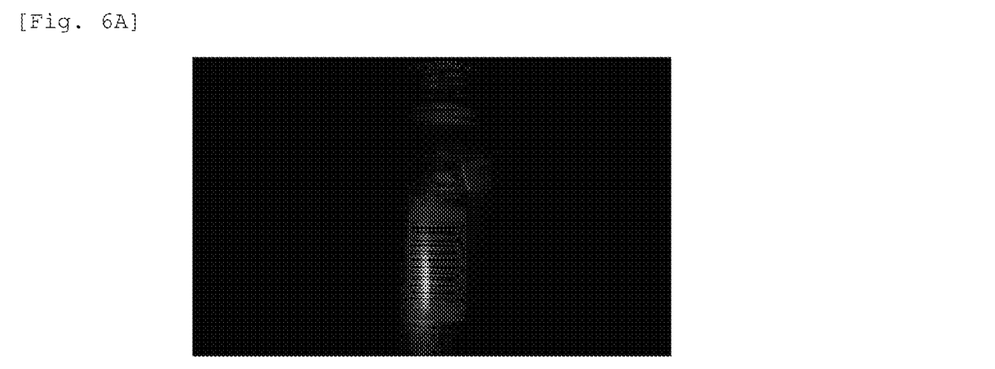
FIG. 6A is an example of an image captured by a camera of the test system, and is a photograph indicating a first image out of 16 images.
Figure 6B:
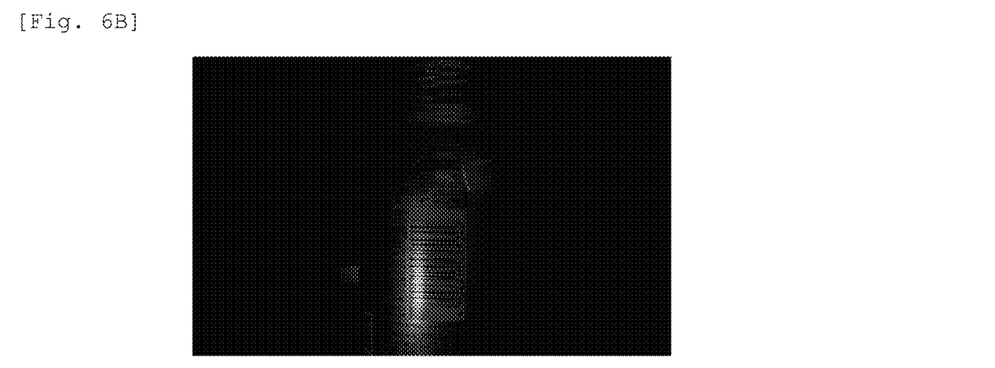
FIG. 6B is an example of an image captured by the camera of the test system, and is a photograph indicating a second image out of 16 images.
Figure 6C:
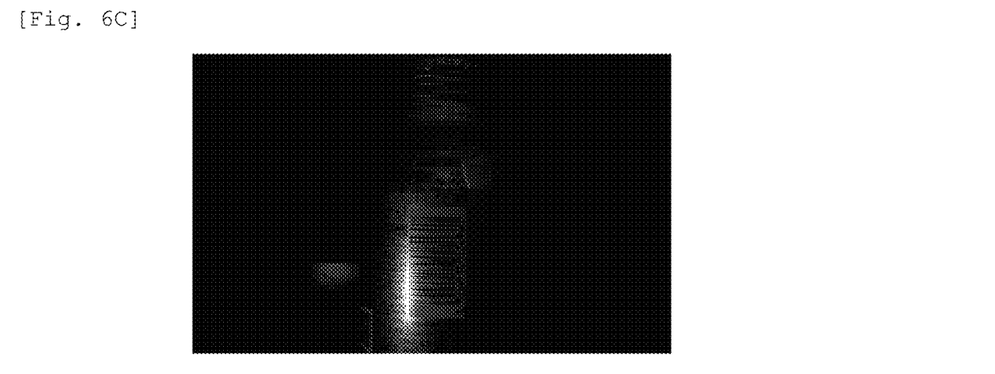
FIG. 6C is an example of an image captured by the camera of the test system, and is a photograph indicating a third image out of 16 images.
Figure 6D:
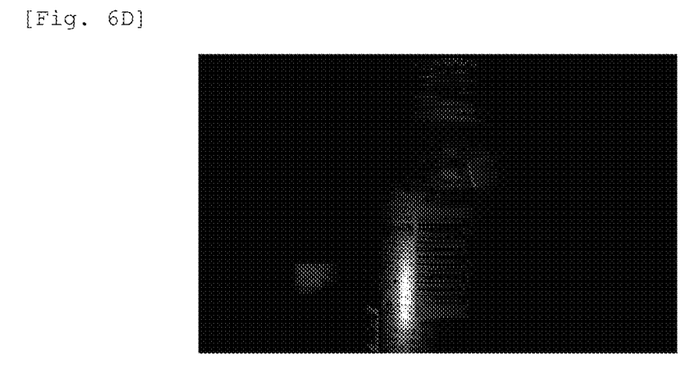
FIG. 6D is an example of an image captured by the camera of the test system, and is a photograph indicating a fourth image out of 16 images.
Figure 6E:
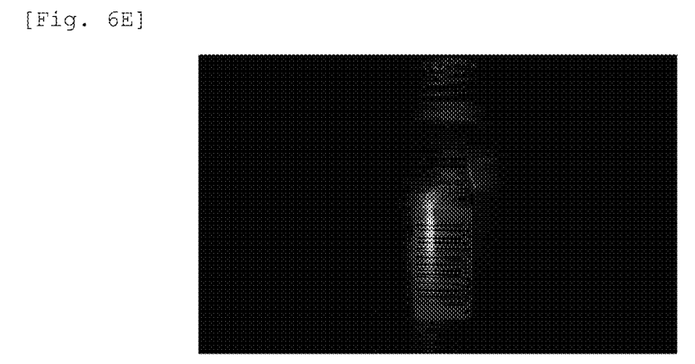
FIG. 6E is an example of an image captured by the camera of the test system, and is a photograph indicating a fifth image out of 16 images.
Figure 6F:
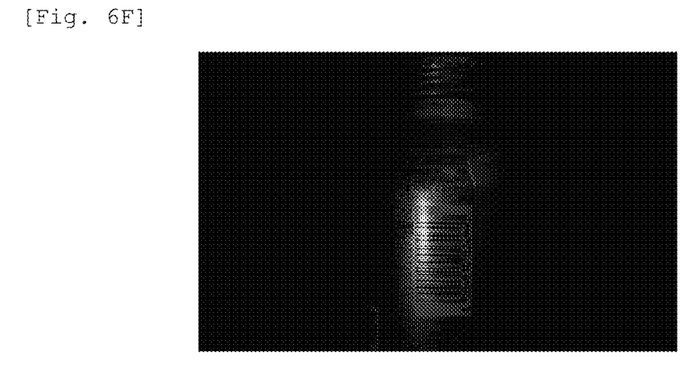
FIG. 6F is an example of an image captured by the camera of the test system, and is a photograph indicating a sixth image out of 16 images.
Figure 6G:
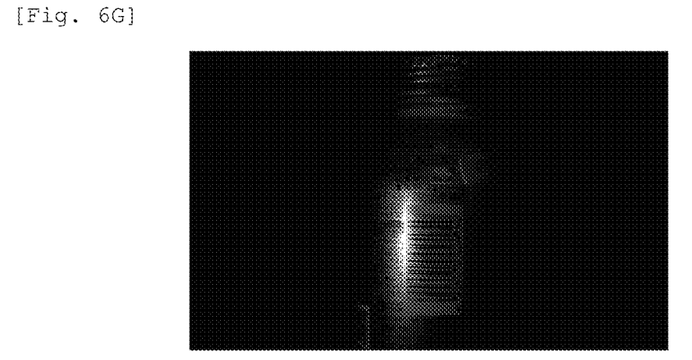
FIG. 6G is an example of an image captured by the camera of the test system, and is a photograph indicating a seventh image out of 16 images.
Figure 6H:
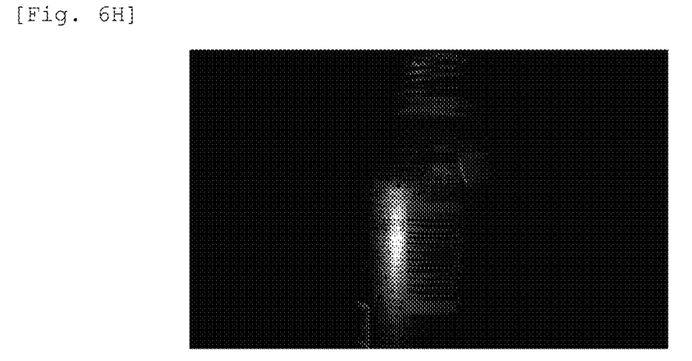
FIG. 6H is an example of an image captured by the camera of the test system, and is a photograph indicating an eighth image out of 16 images.
Figure 6I:
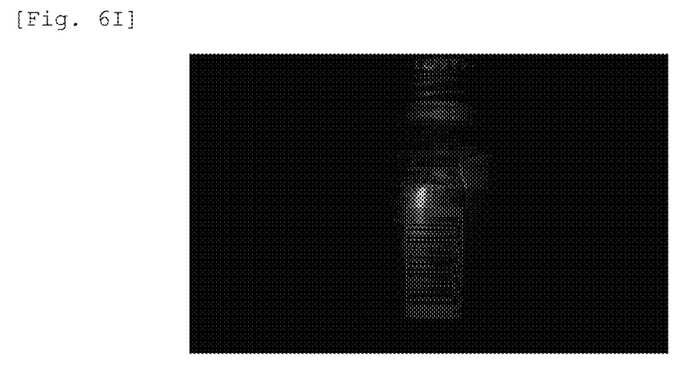
FIG. 6I is an example of an image captured by the camera of the test system, and is a photograph indicating a ninth image out of 16 images.
Figure 6J:
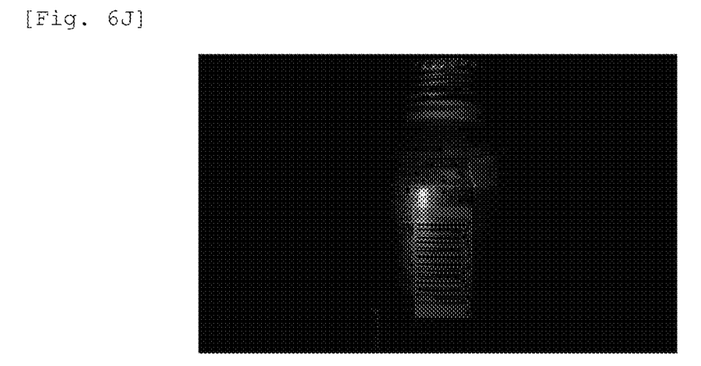
FIG. 6J is an example of an image captured by the camera of the test system, and is a photograph indicating a tenth image out of 16 images.
Figure 6K:
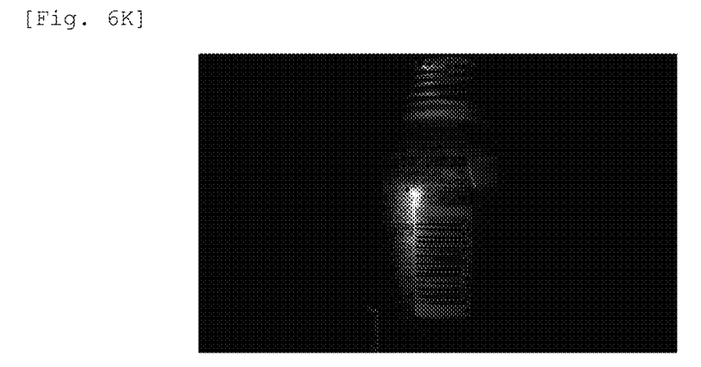
FIG. 6K is an example of an image captured by the camera of the test system, and is a photograph indicating an eleventh image out of 16 images.
Figure 6L:
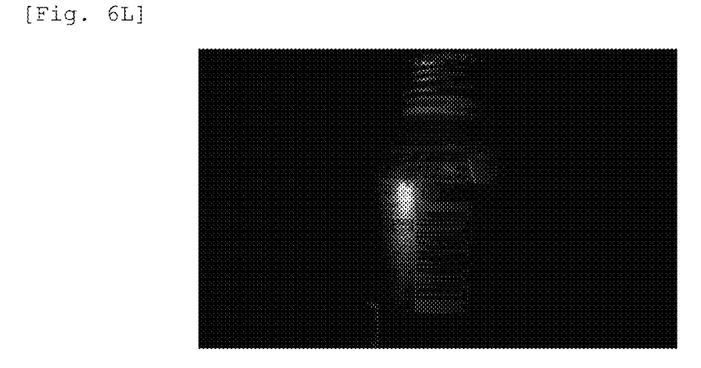
FIG. 6L is an example of an image captured by the camera of the test system, and is a photograph indicating a twelfth image out of 16 images.
Figure 6M:
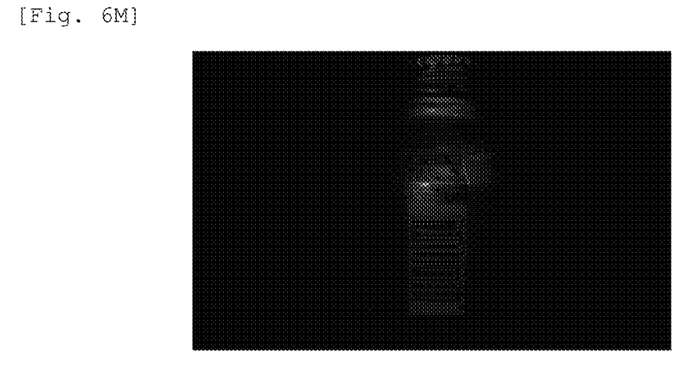
FIG. 6M is an example of an image captured by the camera of the test system, and is a photograph indicating a thirteenth image out of 16 images.
Figure 6N:
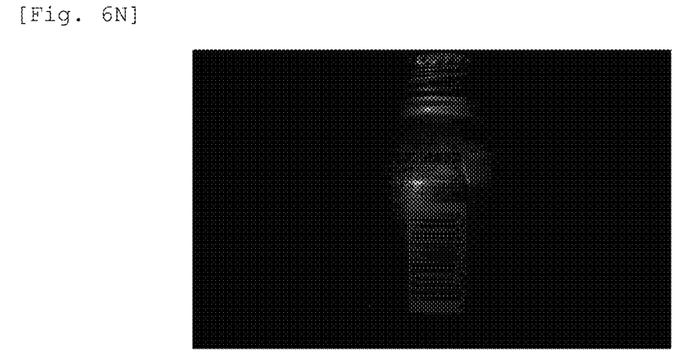
FIG. 6N is an example of an image captured by the camera of the test system, and is a photograph indicating a fourteenth image out of 16 images.
Figure 6O:
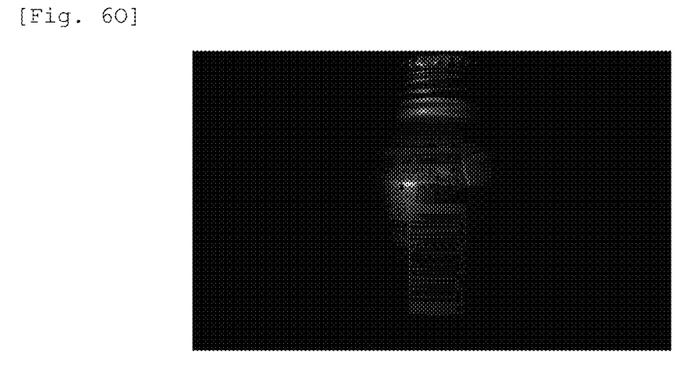
FIG. 6O is an example of an image captured by the camera of the test system, and is a photograph indicating a fifteenth image out of 16 images.
Figure 6P:
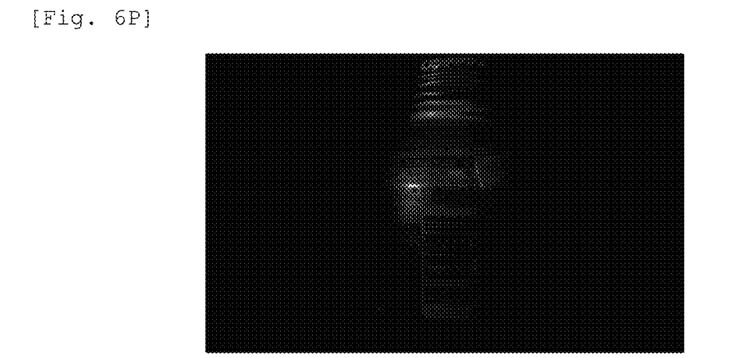
FIG. 6P is an example of an image captured by the camera of the test system, and is a photograph indicating a sixteenth image out of 16 images.

Then N number of images of a same product M captured from a same position, with lighting the only difference, are acquired. For example, if N is 16, then 16 images indicated in FIGS. 6A to 6P are acquired. FIG. 6A is a photograph captured when light is emitted from an area 2$A_1$ of the lighting apparatus 2, FIG. 6B is a photograph captured when light is emitted from an area 2$A_2$ of the lighting apparatus 2, FIG. 6C is a photograph captured when light is emitted from an area 2$A_3$ of the lighting apparatus 2, FIG. 6D is a photograph captured when light is emitted from an area 2$A_4$ of the lighting apparatus 2, FIG. 6E is a photograph captured when light is emitted from an area 2$A_5$ of the lighting apparatus 2, FIG. 6F is a photograph captured when light is emitted from an area 2$A_6$ of the lighting apparatus 2, FIG. 6G is a photograph captured when light is emitted from an area 2$A_7$ of the lighting apparatus 2, FIG. 6H is a photograph captured when light is emitted from an area 2A: of the lighting apparatus 2, FIG. 6I is a photograph captured when light is emitted from an area 2$A_9$ of the lighting apparatus 2, FIG. 6J is a photograph captured when light is emitted from an area 2$A_{10}$ of the lighting apparatus 2, FIG. 6K is a photograph captured when light is emitted from an area 2$A_{11}$ of the lighting apparatus 2, FIG. 6L is a photograph captured when light is emitted from an area 2$A_{12}$ of the lighting apparatus 2, FIG. 6M is a photograph captured when light is emitted from an area 2$A_{13}$ of the lighting apparatus 2, FIG. 6N is a photograph captured when light is emitted from an area 2$A_{14}$ of the lighting apparatus 2, FIG. 6O is a photograph captured when light is emitted from an area 2$A_{15}$ of the lighting apparatus 2, and FIG. 6P is a photo when light is emitted from an area 2$A_{16}$ of the lighting apparatus 2.

The camera 4 operates when DC (direct current) power is supplied through the second wiring cable 7. In the camera 4, the supplied DC power is directly used, or is stepped up or down and then used. Further, the camera 4 supplies the DC power to the lighting controller 3 through the first wiring cable 6, as mentioned above, and the voltage of the DC power to be supplied to the lighting controller 3 may be the same as the voltage of the DC power supplied through the second wiring cable 7, or may be voltage stepped up or down.

The image capturing period Td in the camera 4 is controlled by a signal to control the image capturing period Td transmitted through the second wiring cable 7. The synchronizing signal SY transmitted from the camera 4 to the lighting controller 3 may be generated in the camera 4 synchronizing with the image capturing period Td, or may be transmitted through the second wiring cable 7.

The N number of images (or later mentioned one inspection image) captured by the camera 4 is transmitted to the latter mentioned test system control device 5 through the second wiring cable 7.

Figure 7:
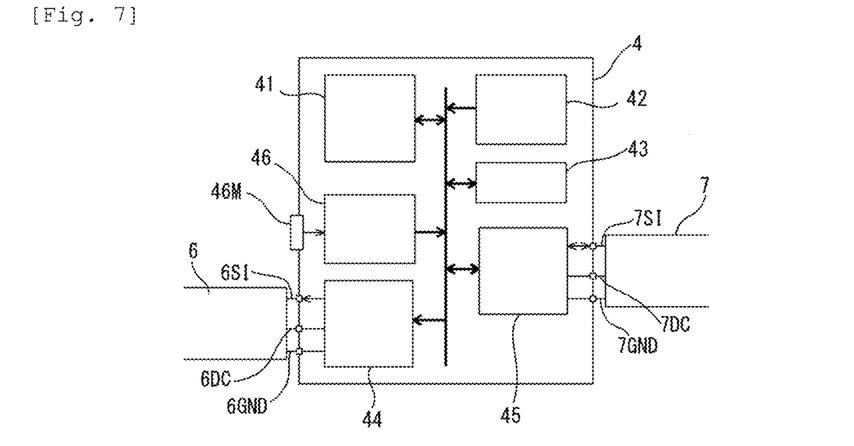
FIG. 7 is a block diagram depicting an example of the camera of the test system.

The detailed configuration of the camera 4 is not especially limited, but may include a CPU 41, a program unit 42, a work memory unit 43, a first interface unit 44, a second interface unit 45, and an imaging unit 46, for example, as illustrated in FIG. 7. In the camera 4, each unit is controlled by the CPU 41 using the work memory unit 43 in accordance with the programs stored in the program unit 42.

In the first interface unit 44, terminals, to which the above mentioned power line 6DC of the first wiring cable 6, signal line 6SI of the signal to control the lighting period Ta, and ground line 6GND are connected respectively, can be disposed.

The second interface unit 45 is a portion to which the second wiring cable 7 is connected. The second wiring cable 7 may include a power line 7DC to supply DC power, a signal line 7SI to transmit a signal to control the image capturing period Td, images and the like, and a ground line 7GND, and terminals to connect each of these lines may be disposed in the second interface unit 45. The signal line 7SI is normally a plurality of lines.

The imaging unit 46 captures images in the above mentioned image capturing period Td using an imaging mechanism 46M. As indicated in FIGS. 6A to 6P, monochrome images can be captured.

The test system control device 5 will be described next. In the test system control device 5, N number of images are reconstructed to one inspection image through inter-image calculation or through inter-image calculation and inter-pixel calculation. The inspection image is an image which an inspector views using the test system 1. The inter-image calculation refers to a calculation among a plurality of images, and the inter-pixel calculation refers to a calculation among adjacent pixels constituting an image.

Figure 8A:
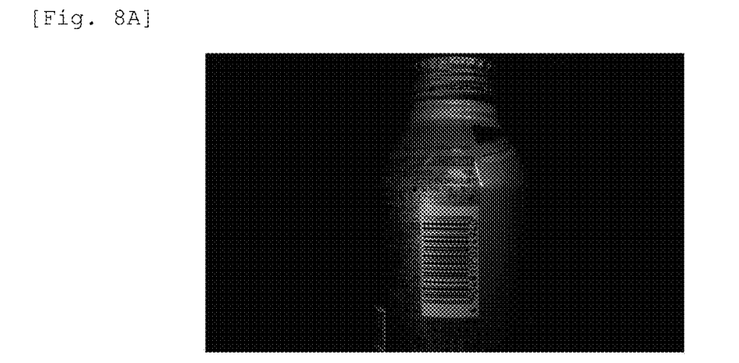
FIG. 8A is an example of an inspection image of the test system, where a brightness value of one image is selected for each pixel.

The inter-image calculation is, for example, a calculation of selecting the brightness value of one image out of N number of images for each pixel. For example, in a case of N=16, the Kth highest brightness value (K is any natural number in the 1 to 16 range) is selected in each pixel. Then one inspection image, as indicated in FIG. 8A, which is equivalent to an image acquired when light is emitted from the N number of areas $2A_1$ to $2A_N$ of the lighting apparatus 2 all at once, is reconstructed. Depending on the value of K that is selected, various inspection images can be acquired. In FIG. 8A, K is 8.

The inter-image calculation may also be, for example, a calculation of selecting brightness values of a plurality of images out of the N number of images and adding the brightness values for each pixel. For example, in the case of N=16, the brightness values, from the Kth highest brightness value (K is any natural number in the 1 to 16 range) to the Lth highest brightness value (L is any natural number that is greater than K, in the 2 to 16 range), are selected and added for each pixel. By this as well, one inspection image, which is equivalent to an image acquired when light is emitted from the N number of areas $2A_1$ to $2A_N$ of the lighting apparatus 2 all at once, is reconstructed. Depending on the values of K and L that are selected, various inspection images can be acquired.

Figure 8B:
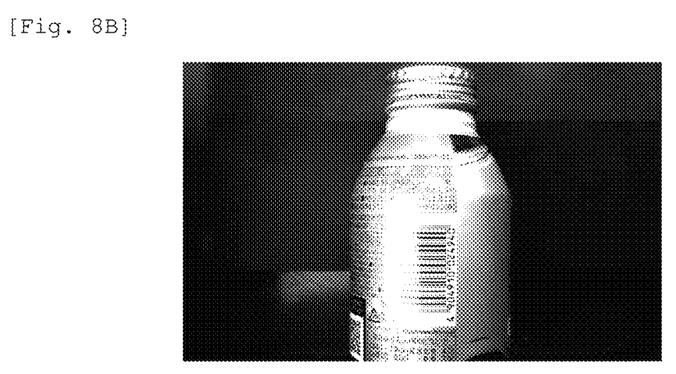
FIG. 8B is an example of an inspection image of the test system, where brightness values of all (16) images are selected and added for each pixel.

For example, if K is set to 1 and L is set to 16, and the brightness values of all the images (16 images) are selected and added for each pixel, one inspection image, as indicated in FIG. 8B, is reconstructed.

Further, the inter-image calculation may also be, for example, a calculation of selecting the brightness values of a plurality of images out of the N number of images and averaging the brightness values for each pixel. For example, in the case of N=16, the brightness values, from the Kth highest brightness value (K is any natural number in the 1 to 16 range) to the Lth highest brightness value (L is any natural number that is greater than K, in the 2 to 16 range), are selected and averaged for each pixel. By this as well, one inspection image, which is equivalent to an image acquired when light is emitted from the N number of areas $2A_1$ to $2A_N$ of the lighting apparatus 2 all at once, is reconstructed. Depending on the values of K and L that are selected, various inspection images can be acquired.

Figure 8C:
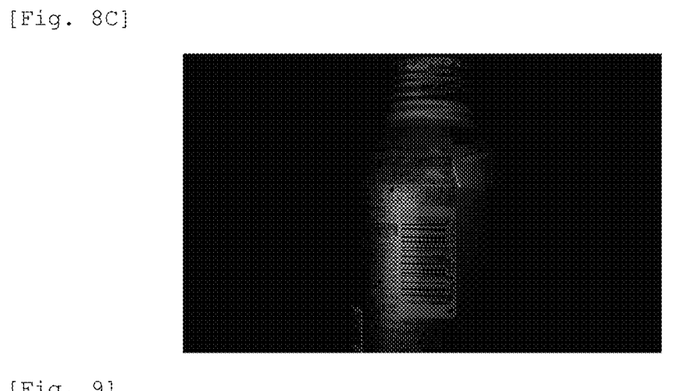
FIG. 8C is an example of an inspection image of the test system, where brightness values of all (16) images are selected and averaged for each pixel.

For example, if K is set to 1 and L is set to 16, and the brightness values of all the images (16 images) are selected and averaged for each pixel, one inspection image, as indicated in FIG. 8C, is reconstructed.

The above examples of the inter-image calculation may be combined with various inter-pixel calculation to reconstruct one inspection image.

Figure 9:
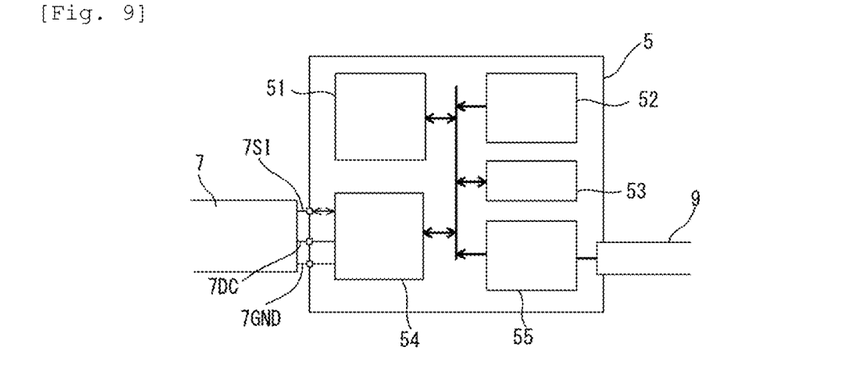
FIG. 9 is a block diagram depicting an example of a test system control device of the test system.

The reconstruction of the inspection image described above may be performed in the camera 4, instead of the test system control device 5. The test system control device 5 also performs various other processing, such as sending the inspection image to a display device, or exchanging data with a system other than the test system 1. The detailed configuration of the test system
control device 5 is not especially limited, but may include a CPU 51, a program unit 52, a work memory unit 53, an interface unit 54, and a power supply unit 55, for example, as illustrated in FIG. 9. In the test system control device 5, the interface unit 54 or the like is controlled by the CPU 51 using the work memory unit 53 in accordance with the programs stored in the program unit 52. The program unit 52 stores a program to reconstruct the inspection image.

In the interface unit 54, terminals, to which the above mentioned power line 7DC of the second wiring cable 7, signal line 7SI and ground line 7GND are connected respectively, can be disposed.

An AC power supply wiring cable 9 is connected to the power supply unit 55, so that DC power for the test system control device 5 is generated by the AC power supply, and is supplied to each portion of the test system control device 5.

Figure 10:
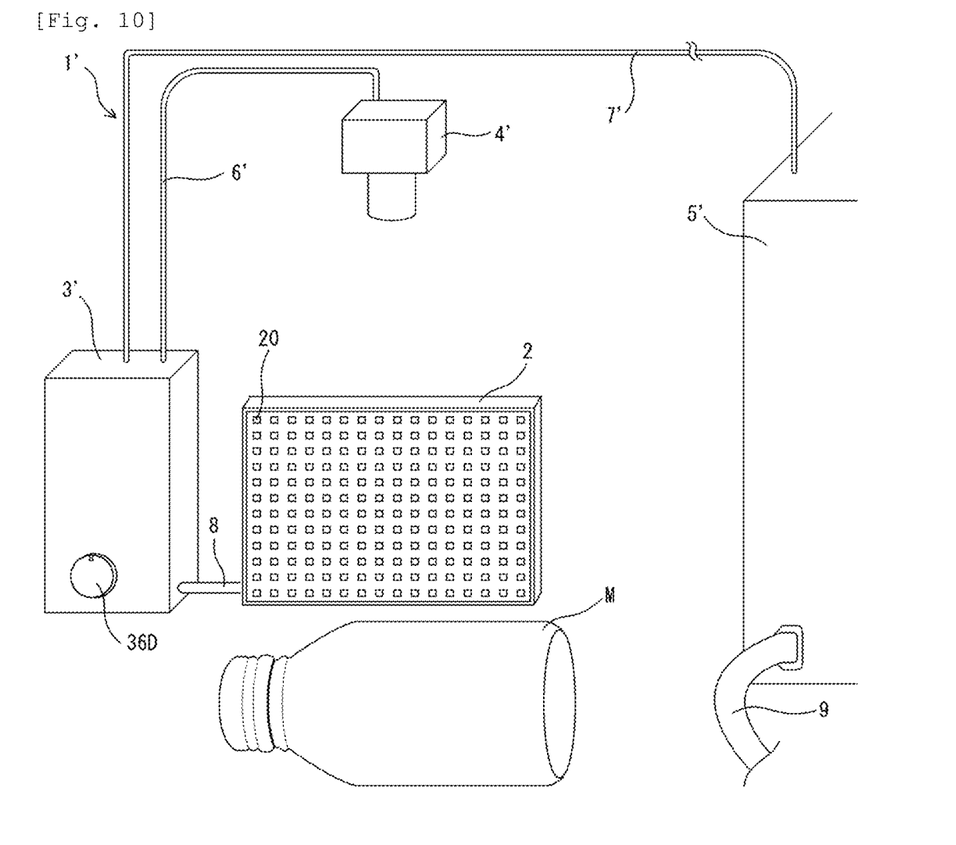
FIG. 10 is a schematic external view depicting another test system according to an embodiment of the present invention.

Another test system 1' according to an embodiment of the present invention will be described next. As illustrated in FIG. 10, the test system 1' includes the lighting apparatus 2, a lighting controller 3', a camera 4', a test system control device 5', a first wiring cable 6', and a second wiring cable 7'. The lighting apparatus 2 is the same as the lighting apparatus described above. The lighting controller 3', the camera 4', the test system control device 5', the first wiring cable 6', and the second wiring cable 7' correspond to the lighting controller 3, the camera 4, the test system control device 5, the first wiring cable 6, and the second wiring cable 7 respectively, but in an external view of the test system 1', the wiring of the second wiring cable 7' is different from the wiring of the second wiring cable 7 in the test system 1. Therefore the lighting controller 3', the camera 4', the test system control device 5', the first wiring cable 6', and the second wiring cable 7' are different from the lighting controller 3, the camera 4, the test system control device 5, the first wiring cable 6, and the second wiring cable 7 respectively in the following aspects.

The lighting controller 3' operates when the DC current (direct current) is supplied through the second wiring cable 7', and is controlled by signals to control the lighting period Ta, transmitted through the second wiring cable 7'. The lighting controller 3' also sends a signal to control the image capturing period Td, including the synchronizing signal SY, to the camera 4' through the first wiring cable 6'. This synchronizing signal SY may be generated in the lighting controller 3' synchronizing with the lighting period Ta, or may be transferred through the second wiring cable 7'. The lighting controller 3' also receives N number of images (or one inspection image) captured by the camera 4' through the first wiring cable 6', and transmits the images to the test system control device 5' through the second wiring cable 7'. In this way, the lighting controller 3'
sequentially (not all at once) supplies the current $I_J$ to each area $2A_J$ of the lighting apparatus 2, hence the lighting controller 3' does not require a large amount of power, that is, it is sufficient to connect the second wiring cable 7' from the test system control device 5', without connecting the AC power supply wiring cable, and connect the first wiring cable 6' to the camera 4'. Therefore wiring can be simplified.

Figure 11:
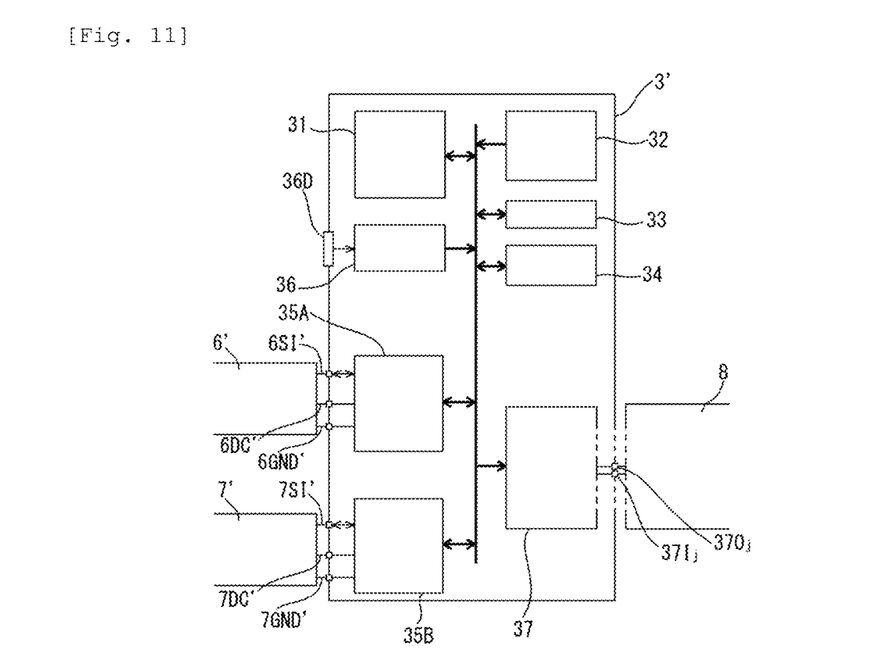
FIG. 11 is a block diagram depicting an example of a lighting controller of the other test system.

The detailed configuration of the lighting controller 3' is that, as illustrated in FIG. 11, a first interface unit 35A and a second interface unit 35B are included instead of the interface unit 35 of the lighting controller 3. The first interface unit 35A is a portion to which the first wiring cable 6' is connected. The first wiring cable 6' may include a power line 6DC' to supply DC power, a signal line 6SI' to transmit a signal to control the image capturing period Td, images and the like, and a ground line 6GND', and terminals to connect each of these lines may be disposed in the first interface unit 35A. The signal line 6SI' is normally a plurality of lines.

The second interface unit 35B is a portion to which the second wiring cable 7' is connected. The second wiring cable 7' may include a power line 7DC' to supply DC power, and a signal line 7SI' to transmit a signal to control the lighting period Ta, images and the like, and a ground line 7GND', and terminals to connect each of these lines may be disposed in the second interface unit 35B. The signal line 7SI' is normally a plurality of lines.

The camera 4' operates when the DC (direct current) power is supplied through the first wiring cable 6'. The N number of images (or one inspection image) captured by the camera 4' is transmitted to the test system control device 5' through the first wiring cable 6' and the second wiring cable 7', as mentioned above.

Figure 12:
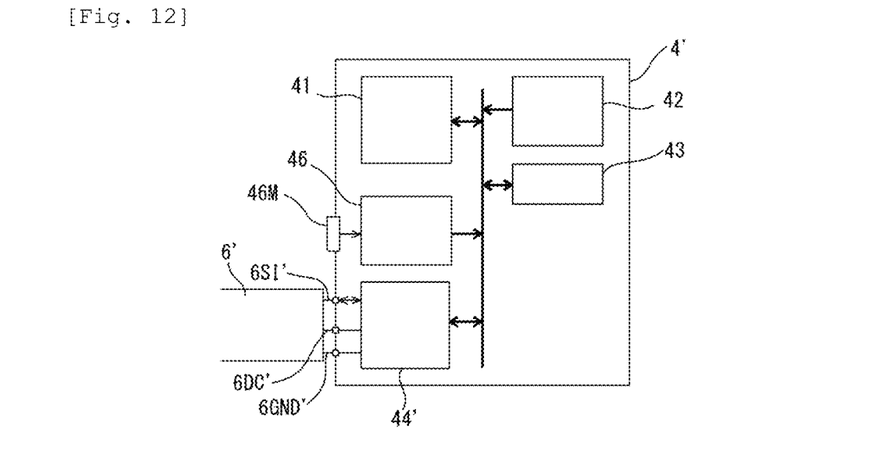
FIG. 12 is a block diagram depicting an example of a camera of the other test system.

The detailed configuration of the camera 4' is that, the second interface unit 45 of the camera 4 is not included, and an interface unit 44' is included instead of the first interface unit 44, as illustrated in FIG. 12. In the interface unit 44', terminals, to which the above mentioned power line 6DC' of the first wiring cable 6', signal line 6SI' and ground line 6GND' are connected respectively, can be disposed.

Figure 13:
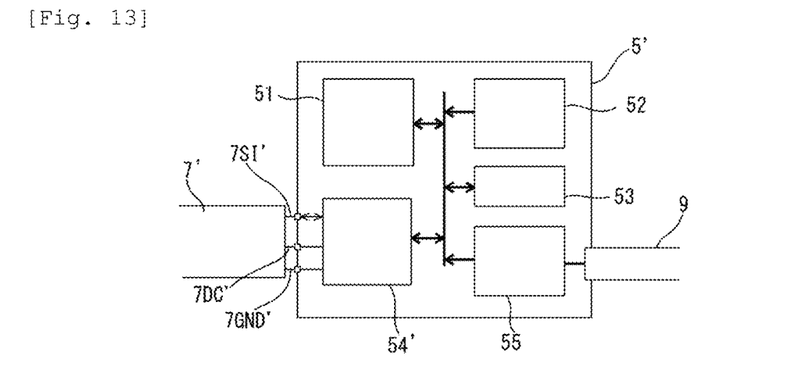
FIG. 13 is a block diagram depicting an example of a test system control device of the other test system.

The detailed configuration of the test system control device 5' is that an interface unit 54' is included, as illustrated in FIG. 13, instead of the interface unit 54 of the test system control device 5. In the interface unit 54', terminals, to which the above mentioned power line 7DC' of the second wiring cable 7', signal line 7SI' and ground line 7GND' are connected respectively, can be disposed.

Now a case where the lighting apparatus 2 of the test system 1 (or 1') is a color lighting type will be described. In this case, the camera 4 (or 4') can capture monochrome images.

The lighting apparatus 2 includes the red, green and blue light-emitting elements 20 for each of the N number of areas $2A_1$ to $2A_N$. For F the red, green and blue light-emitting elements 20, the current inflow terminals 211 to 2 IN and the current outflow terminals 201 to 20N are disposed for each of the areas $2A_1$ to $2A_N$ respectively.

The lighting controller 3 (or 3') sequentially supplies current to the light-emitting elements 20 having a first color out of red, green and blue in each of the N number of areas $2A_1$ to $2A_N$ to emit the light in each lighting period Ta, then sequentially supplies current to the light-emitting elements 20 having a second color (other than the first color) in each of the N number of areas $2A_1$ to $2A_N$ to emit the light in each lighting period Ta, and then sequentially supplies current to the light-emitting elements having a third color (other than the first color and the second color) in each of the N number of areas $2A_1$ to $2A_N$ to emit the light in each lighting period Ta.

The camera 4 (or 4') sequentially captures images in the image capturing period Td, as described above. In the test system control device 5 (or 5'), one inspection image is reconstructed, as described above, for red, green and blue respectively, and then these three colors of inspection images are combined. As a result, one color inspection image is generated.

While the test systems according to embodiments of the present invention have been described, the present invention is not limited to these embodiments, and design thereof may be changed in various way within a scope of the content of the claims. For example, the test system 1' may include a third wiring cable, so that the N number of images (or one inspection image) captured by the camera 4' are transferred directly to the test system control device 5' through the third wiring cable, although the effect of simplifying wiring is lessened in this case.

REFERENCE SIGNS LIST 1, 1' Test system
2 Lighting apparatus
20 Light-emitting element
21 Resistor
$2A_J$ ($2A_1$ to $2A_N$) Area
$2I_J$ ($2I_1$ to $2I_N$) Current inflow terminal
$2O_J$ ($2O_1$ to $2O_N$) Current outflow terminal
3, 3' Lighting controller
31 CPU
32 Program unit
33 Set value storing unit
34 Work memory unit
35 Interface unit
35A First interface unit
35B Second interface unit
36 Setting unit
36D Setting dial
37 Lighting apparatus current supply unit
$37I_J$ ($37I_1$ to $37I_N$) Lighting apparatus current inflow terminal
$37O_J$ ($37O_1$ to $37O_N$) Lighting apparatus current outflow terminal
4, 4' Camera
41 CPU
42 Program unit
43 Work memory unit
44 First interface unit
44 Interface unit
45 Second interface unit
46 Imaging unit
46M Imaging mechanism
5, 5' Test system control device
51 CPU
52 Program unit
53 Work memory unit
54, 54' Interface unit
55 Power supply unit
6, 6' First wiring cable
6DC, 6DC' Power line
6SI, 6SI' Signal line
6GND, 6GND' Ground line
7, 7' Second wiring cable
7DC, 7DC' Power line
7SI, 7SI' Signal line
7GND, 7GND' Ground line
8 Connect member
9 AC power supply wiring cable
$I_J$ ($I_1$ to $I_N$) Current
M Product
PH Signal to start image capturing
SY Synchronizing signal
Ta Lighting period
Tb Cycle of PWM
Tc Pulse width of PWM
Td Image capturing period

The invention claimed is:

1. A test system, comprising:
a lighting apparatus which includes a plurality of light-emitting elements, and which emits light from the plurality of light-emitting elements so as to light a product that is to be inspected;
a lighting controller which divides the plurality of light-emitting elements into N number of areas with N being a natural number that is 2 or more, and which sequentially supplies current to each of the N number of areas so as to emit light in each lighting period;
a camera which sequentially captures images of the product in an image-capturing period synchronized with the lighting period;

a test system control device;

a first wiring cable which supplies DC power from the camera to the lighting controller or from the lighting controller to the camera; and a second wiring cable which supplies DC power from the test system control device to the camera or from the test system control device to the lighting controller, wherein N number of images captured by the camera are reconstructed to one inspection image in the test system control device or in the camera, through inter-image calculation, or through inter-image calculation and inter-pixel calculation.

2. The test system according to claim 1, wherein the inter-image calculation is a calculation, for each pixel, of selecting a brightness value of one image out of the N number of images, or selecting and adding brightness values of a plurality of images out of the N number of images, or is a calculation of selecting and averaging brightness values of a plurality of the images out of the N number of images.

3. The test system according to claim 1, wherein the first wiring cable supplies the DC power from the camera to the lighting controller and transmits a signal to control the lighting period, and the second wiring cable supplies the DC power from the test system control device to the camera and transmits a signal to control the image-capturing period.

4. The test system according to claim 1, wherein the first wiring cable supplies the DC power from the lighting controller to the camera and transmits a signal to control the image-capturing period, and the second wiring cable supplies the DC power from the test system control device to the lighting controller and transmits a signal to control the lighting period.

5. The test system according to claim 1, wherein the lighting apparatus includes red, green and blue light-emitting elements for each of the N number of areas, and the lighting controller sequentially supplies current to the light-emitting elements having a first color out of the red, green and blue in each of the N number of areas to emit the light in the lighting period, then sequentially supplies current to the light-emitting elements having a second color, other than the first color, in each of the N number of areas to emit the light in the lighting period, and then sequentially supplies current to the light-emitting elements having a third color, other than the first color and the second color, in each of the N number of areas to emit the light in the lighting period.

* * * * *